J. E. ALLEN.
MOTOR CYCLE.
APPLICATION FILED SEPT. 23, 1908.
941,903.
Patented Nov. 30, 1909.
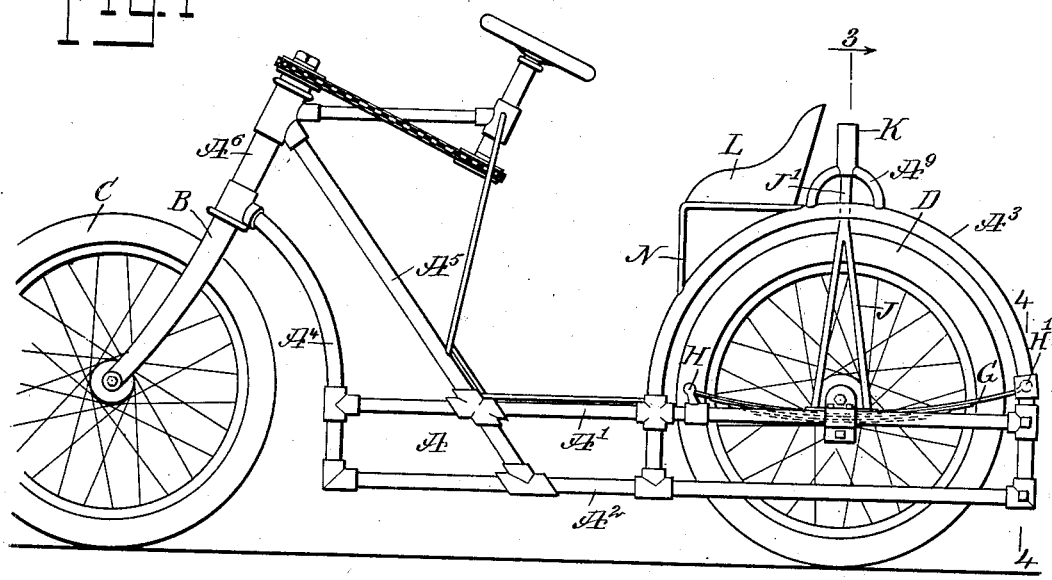
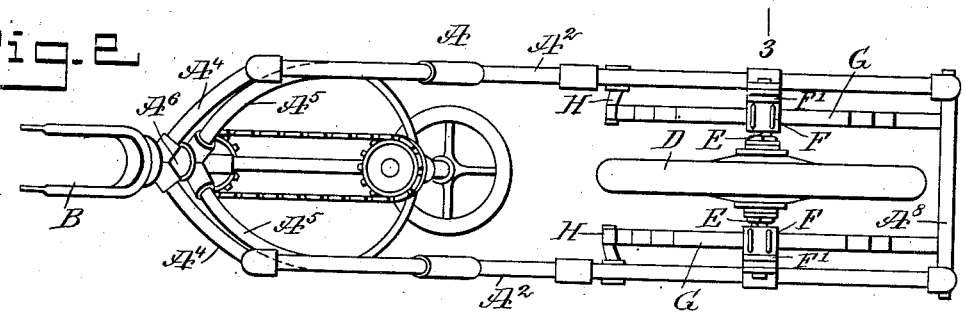
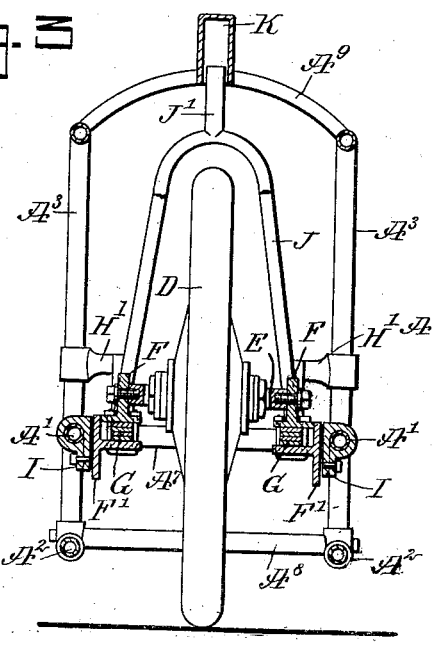
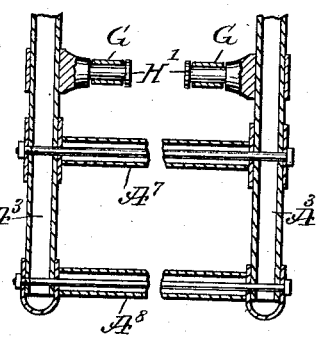
WITNESSES
INVENTOR
John E. Allen
BY
ATTORNEYS

UNITED STATES PATENT OFFICE.

JOHN E. ALLEN, OF TRENTON, NEW JERSEY.

MOTOR-CYCLE.

941,903.  Specification of Letters Patent.  Patented Nov. 30, 1909.

Application filed September 23, 1908. Serial No. 454,330.

*To all whom it may concern:*

Be it known that I, JOHN E. ALLEN, a citizen of the United States, and a resident of Trenton, in the county of Mercer and State of New Jersey, have invented new and useful Improvements in Motor-Cycles, of which the following is a full, clear, and exact description.

The object of the invention is to provide certain new and useful improvements in motor cycles, whereby the main frame is spring-supported at both wheels, to reduce the shock and jar, incident to riding over rough places, to a minimum, the construction of the frame permitting the use of long and strong elliptical springs, and bringing the rider's seat as low down as possible.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement, the motor and the connection between the motor and drive wheel being omitted; Fig. 2 is an inverted plan view of the same; Fig. 3 is an enlarged cross section of the same on the line 3—3 of Fig. 1; and Fig. 4 is a similar view of the same on the line 4—4 of Fig. 1.

The main frame A of the motor cycle consists of two parallel sides, each formed of longitudinally-extending bars $A'$, $A^2$, arranged one above the other, and connected with each other by an arched bar $A^3$, as plainly indicated in Fig. 1, the forward ends of the bars $A'$, $A^2$ of each side of the main frame A being connected by lower and upper braces $A^4$, $A^5$ with the steering head $A^6$, in which is mounted to turn the spring-pressed fork B, carrying the front or steering wheel C in the usual manner. The rear ends of the bars $A'$, $A^2$ of the two sides of the main frame A are rigidly connected with each other by cross bars $A^7$, $A^8$, and a cross bar $A^9$ connects the tops of the arch-shaped bars $A^3$ with each other, as indicated in Fig. 3. The rear wheel D is arranged between the sides of the main frame A and is approximately concentric to the arch-shaped bars $A^3$, and the ends of the axle E of the rear wheel D are supported on clips F secured to the middle of longitudinally-extending flat elliptical springs G, of one or more leaves, and pivotally connected at their front ends to pivots H held on the side bars $A'$, the rear ends of the leaf springs G being held on pivots $H'$ attached to the arched bars $A^3$ (see Figs. 1 and 4). By the arrangement described, the wheel D is spring-mounted on the main frame by the use of the elliptical springs G, which are exceedingly strong and durable and reduce the vibrations to a minimum, thereby insuring easy riding of the motor cycle over rough or uneven places.

The clips F are provided with rubbing plates $F'$ (see Figs. 2 and 3) in contact with rubbing irons or bearings I secured to the side bars $A'$, so that the springs G are guided in their up and down swinging movement, and at the same time are held against lateral movement, thus insuring true running of the rear or drive wheel D. To the clips F are secured the terminals of the members of the rear fork J, extending upwardly and provided with a shank $J'$ extending into a bearing K held on the top cross bar $A^9$, as plainly indicated in Figs. 1 and 3. Thus by the use of the rear fork J mounted in the manner described, further lateral movement of the springs G and consequently of the wheel D is prevented, to aid in keeping the wheel D in proper running condition.

By having the main frame A provided with the arched or segmentally-shaped bars $A^3$, the seat L for the rider can be arranged low down, as plainly indicated in Fig. 1, the seat being for this purpose mounted on brackets N secured to the front portion of the segmental or arch-shaped bars $A^3$.

By constructing the main frame A in the manner described, an exceedingly strong and durable frame is provided, not liable to break or easily get out of order.

It is understood that the bars forming the members of the frame A are preferably tubular, as indicated in Figs. 3 and 4.

Having thus described my invention, I claim as new and desire to secure by Letters Patent:

1. A motor cycle provided with a frame, a rear wheel, longitudinally-extending semi-elliptical springs secured at their ends to the said frame, clips at the middle of the said springs for connection with the axle of the said rear wheel, and a rear fork having its members connected with the said clips the frame having a bearing with which the shank of the fork engages.

2. A motor cycle provided with a frame, a rear wheel, longitudinally-extending semi-elliptical springs secured at their ends to the said frame, clips at the middle of the said springs for connection with the axle of the said rear wheel, and a rear fork having its members connected with the said clips, the frame having a bearing with which the shank of the fork engages, the said clips having a sliding engagement with the said frame.

3. A motor cycle provided with a frame, a rear wheel, longitudinally-extending semi-elliptical springs secured at their ends to the said frame, clips at the middle of the said springs for connection with the axle of the said rear wheel, and a rear fork having its members connected with the said clips, the frame having a bearing with which the shank of the fork engages, the said clips fitting, with their outer faces, slidingly against the inner faces of the bearings on the sides of the frame.

4. A motor cycle frame, comprising sides, each formed of a pair of longitudinally-extending side bars located one above the other, and an arched bar having its terminals secured to the said longitudinal bars of the corresponding side bars, cross bars connecting the said longitudinal bars and the said arched bars with each other, a steering head, lower braces, and upper braces, the said braces connecting the said side bars with the said steering head.

In testimony whereof I have signed my name to this specification in the presence of two subscribing witnesses.

JOHN E. ALLEN.

Witnesses:
 THEO. G. HOSTER,
 JOHN P. DAVIS.